(12) United States Patent
Lieu

(10) Patent No.: US 12,097,687 B1
(45) Date of Patent: Sep. 24, 2024

(54) PHOSPHORESCENT PACKAGING MATERIALS

(71) Applicant: Printpack Illinois, Inc., Elgin, IL (US)

(72) Inventor: Dawn Michelle Lieu, Lakeville, MN (US)

(73) Assignee: Printpack Illinois, Inc., Elgin, IL (US)

( * ) Notice: Subject to any disclaimer, the term of this patent is extended or adjusted under 35 U.S.C. 154(b) by 349 days.

(21) Appl. No.: 16/936,483

(22) Filed: Jul. 23, 2020

Related U.S. Application Data

(60) Provisional application No. 62/878,475, filed on Jul. 25, 2019.

(51) Int. Cl.
| | |
|---|---|
| *B32B 27/18* | (2006.01) |
| *B32B 1/00* | (2006.01) |
| *B32B 7/023* | (2019.01) |
| *B32B 7/12* | (2006.01) |
| *B32B 27/08* | (2006.01) |
| *B32B 37/12* | (2006.01) |
| *B32B 37/20* | (2006.01) |
| *B65D 33/00* | (2006.01) |
| *B65D 75/26* | (2006.01) |
| *B65D 75/52* | (2006.01) |

(52) U.S. Cl.
CPC .............. *B32B 27/18* (2013.01); *B32B 1/00* (2013.01); *B32B 7/023* (2019.01); *B32B 7/12* (2013.01); *B32B 27/08* (2013.01); *B32B 37/12* (2013.01); *B32B 37/203* (2013.01); *B65D 33/004* (2013.01); *B65D 75/26* (2013.01); *B65D 75/52* (2013.01); *B32B 2307/41* (2013.01); *B32B 2307/418* (2013.01); *B32B 2307/422* (2013.01); *B32B 2439/46* (2013.01)

(58) Field of Classification Search
CPC .. B32B 27/18; B32B 1/02; B32B 1/08; B32B 2307/41; B32B 2307/418; B32B 2307/422; B65D 33/004; B65D 75/26; B65D 75/52
See application file for complete search history.

(56) References Cited

U.S. PATENT DOCUMENTS

| | | |
|---|---|---|
| 6,830,835 B2 | 12/2004 | Saito et al. |
| 7,674,532 B2 | 3/2010 | Einhorn et al. |
| 10,479,577 B2 | 11/2019 | Suryanarayanan et al. |
| 2002/0106429 A1* | 8/2002 | Mudar .................... B32B 27/32 383/94 |
| 2002/0119294 A1 | 8/2002 | Monkarash et al. |

(Continued)

FOREIGN PATENT DOCUMENTS

| | | |
|---|---|---|
| EP | 1357046 A1 | 10/2003 |
| WO | 2019/059958 A1 | 3/2019 |
| WO | 2019/067005 A1 | 4/2019 |

OTHER PUBLICATIONS

English machine translation for JP2864917 (Mar. 8, 1999) (Year: 1999).*

*Primary Examiner* — Michael C Miggins
(74) *Attorney, Agent, or Firm* — Additon, Pendleton & Witherspoon, P.A.

(57) ABSTRACT

An inner layer of packaging material includes phosphorescent material, and the packaging material is configured so that graphics of the packaging material are backlit by light emitted from the phosphorescent material. The packaging material can be a laminate, and the inner layer including the phosphorescent material can be a tie layer of the laminate.

11 Claims, 2 Drawing Sheets

(56) References Cited

U.S. PATENT DOCUMENTS

2003/0203230 A1* 10/2003 Pellingra .................. B32B 3/30
                                                    428/515
2004/0064989 A1    4/2004  Nottage et al.
2015/0060311 A1    3/2015  Mendoza da Silva

* cited by examiner

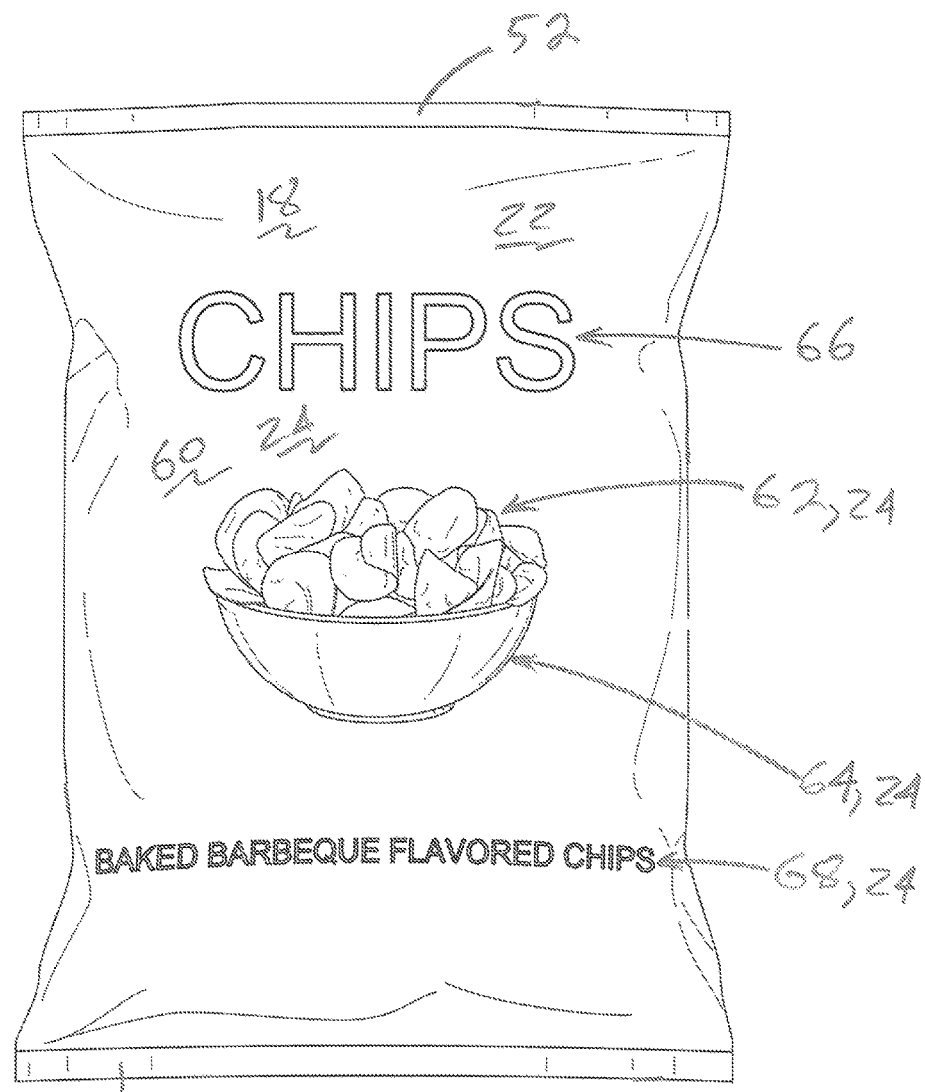

US 12,097,687 B1

PHOSPHORESCENT PACKAGING MATERIALS

CROSS-REFERENCE TO PRIORITY APPLICATION

This application claims the benefit of U.S. Provisional Patent Application No. 62/878,475 filed Jul. 25, 2019, which is incorporated herein by reference in its entirety.

BACKGROUND

The present invention relates to packaging material and, more particularly, to packaging material including a component that glows in the dark.

It is known to include phosphor in printed ink of packaging materials so that the phosphor in the ink glows in the dark.

There is a desire for packaging materials that include phosphor and provide a new balance of properties.

SUMMARY

An aspect of this disclosure is the provision of packaging material including at least one interior layer comprising phosphor, so that the packaging material can be "activated" with sufficient exposure to light to glow in the dark. The glow (e.g., phosphorescence or afterglow) can emanate outwardly through the packaging material so that all or a portion of any graphics (e.g., images, text, shapes, indicia, patterns, solid areas, or any other printing) of the packaging material are backlit by the glow.

The packaging material can include an outer web (e.g., printed web) and an inner web that are joined to one another by at least one intermediate layer (e.g., tie layer) positioned between the outer and inner webs. In one aspect of this disclosure, the intermediate layer includes phosphor, and the packaging material is configured so that the phosphor can function as an internal, phosphorescent light source. In a backlit state of use of the packaging material (e.g., when the packaging material is in sufficient darkness after being exposed to sufficient light), graphics that are at least partially defined by ink of the outer web can be visually observed by a user viewing an outer side of the outer web (e.g., at least some of the ink is backlit by the internal, phosphorescent light source). In a frontlit state of use of the packaging material, graphics that are at least partially defined by the ink can be visually observed by a user viewing the outer side of the outer web (e.g., at least some of the ink is frontlit by a luminous source (e.g., natural or artificial light) that is exterior to the packaging material and directing light toward and onto the outer side of the outer web). The phosphorescent light source and ink can be cooperatively configured so that the graphics of the backlit state vary from the graphics of the frontlit state. The variations can include variations in color(s) and/or hue(s).

The foregoing summary provides a few brief examples and is not exhaustive, and the present invention is not limited to the foregoing examples. The foregoing examples, as well as other examples, are further explained in the following detailed description with reference to accompanying drawings.

BRIEF DESCRIPTION OF THE DRAWINGS

The drawings are provided as examples, and they are schematic and may not be drawn to scale. The present invention may be embodied in many different forms and should not be construed as limited to the examples depicted in the drawings.

FIG. 3 is a front view of a closed bag formed from a piece of the packaging material of FIG. 1, in accordance with an embodiment of this disclosure.

DETAILED DESCRIPTION

Examples of embodiments are disclosed in the following. The present invention may, however, be embodied in many different forms and should not be construed as limited to the embodiments set forth herein. For example, features disclosed as part of one embodiment or example can be used in the context of another embodiment or example to yield a further embodiment or example. As another example of the breadth of this disclosure, it is within the scope of this disclosure for one or more of the terms "substantially," "about," "approximately," and/or the like, to qualify each of the adjectives and adverbs of the Detailed Description section of disclosure, as discussed in greater detail below.

Figure 1:
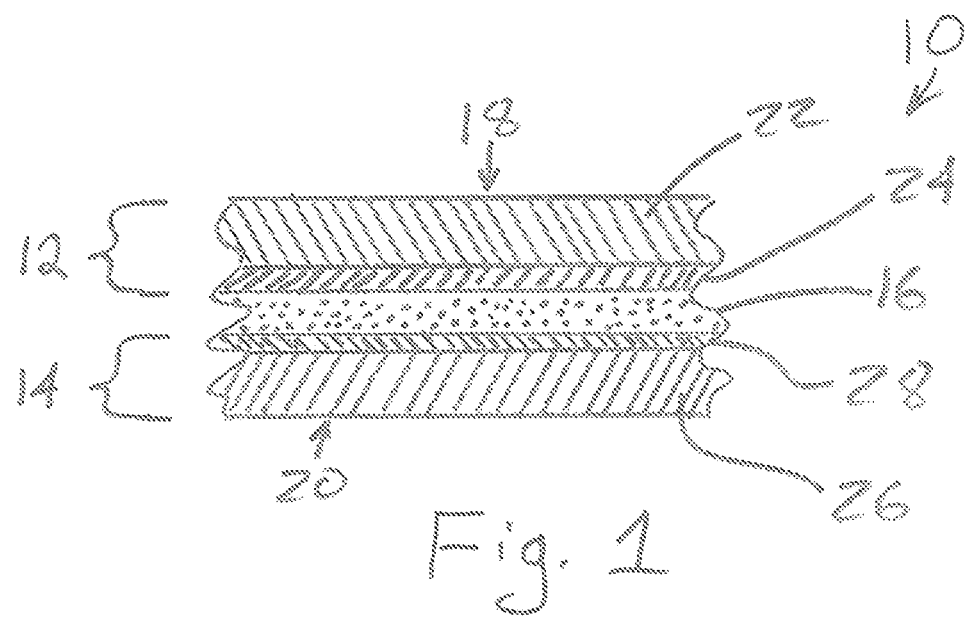
FIG. 1 is a cross-sectional view of a portion of a web of composite material that may be used as packaging material, wherein the cross-section is taken perpendicular to the length of a flat piece of the packaging material, in accordance with an embodiment of this disclosure.

FIG. 1 schematically depicts an exemplary packaging material/composite material/composite structure 10. The material 10 may be suitable for use as a flexible packaging material, for example, for food or other suitable items. As shown in FIG. 1, the material 10 may generally include a plurality of layers in a superposed, facing, contacting relationship with one another. The layers may generally be continuous, as will be understood in the art, and as will be described further below.

More particularly, in the example depicted in FIG. 1, the material 10 includes a first or outer composite layer or web 12 (e.g., printed web) and a second or inner composite layer or web 14 (e.g., barrier web) that are joined to one another by at least one intermediate web or layer 16 (e.g., intermediate material(s), tie layer(s), and/or other suitable material(s)). When a package is formed from the material 10, the outer web 12 can define an outer side or surface 18 of the package, and the inner web 14 can define an inner side or surface 20 of the package, as discussed further below. In the following, for ease of understanding, and not for the purpose of limiting the scope of this disclosure, a frame of reference defined by a package having an outer surface 18 and an inner or interior surface 20 may be used for naming some of the components of the material 10.

In accordance with an embodiment of this disclosure, the outer web 12 includes at least one first or outer polymer film layer 22 (e.g., print film layer) and at least one ink layer 24; the inner web 14 includes at least one second or inner polymer film layer 26 (e.g., sealable film layer) and it optionally further includes a barrier layer 28; and the intermediate layer 16 can be a tie layer (e.g., an extruded/extrusion layer).

The outer film layer 22 is typically transparent, or more generally the outer film layer may be transparent and/or translucent. If present, the barrier layer 28 can be opaque, and it may comprise, consist essentially of, or consist of a relatively thin metallic or non-metallic layer (e.g., aluminum, aluminum oxide and/or other suitable material) configured to restrict fluid diffusion.

As will be understood by those of skill in the art, the ink 24 may generally be printed (e.g., reverse printed) onto the inner side of the outer film 22 (i.e., the surface of the outer film 22 distal from the opposite exterior surfaces 18, 20 of the packaging material 10). However, in an alternative embodiment (not shown), the ink 24 may be printed onto the outer surface of the outer film 22, such as, for example, where the ink layer 24 is formed from curable ink(s), such as energy curable ink(s) (e.g., UV or e-beam, curable ink).

The outer film 22 may comprise any suitable polymer, copolymer, or blend of polymers. Examples of polymer films that may be suitable include polyester (e.g., polyethylene terephthalate) films, polypropylene films, polyethylene films, nylon films, films including blends or copolymers of polyethylene terephthalate, polypropylene, polyethylene, and/or nylon, or coextruded films including one or more of the above. The outer film 22 may generally have a basis weight of from about 5 to about 20 lb/ream, for example, from about 8 to about 15 lb/ream, for example, about 10 lb/ream.

The at least one intermediate layer 16 may comprise any material suitable for use in joining the outer web 12 and the inner web 14 to one another (e.g., polymeric material suitable for use as an extrudate used in extrusion lamination, a hot-melt adhesive formed of thermoplastic polymeric material, or the like). For example, the intermediate layer 16 may comprise polyethylene, linear low density polyethylene, low density polypropylene, linear low density polypropylene, low density ethylene vinyl alcohol (EVOH), linear low density EVOH, Surlyn™ ionomer (copolymer of ethylene and methacrylic acid), or any suitable combination thereof. The intermediate layer 16 may have a basis weight of from about 3 to about 20 lb/ream, for example, from about 5 to about 15 lb/ream, for example, about 10 lb/ream. The polymeric material of the intermediate layer 16 may be transparent, translucent, or somewhat opaque, as discussed further below.

The intermediate layer 16 may further comprise a luminescent component, for example a phosphorescent component (e.g., phosphor and/or phosphorescent pigment) that renders the packaging material capable of glowing (e.g., emitting visible light) in the dark after sufficient activation by exposure to light (e.g., visible light and/or ultraviolet radiation or light). The phosphorescent component is schematically represented by stippling in FIG. 1. The phosphorescent component can be selected so that it continues to glow in the dark for an extended period of time (e.g., for numerous minutes or several hours) after being exposed to light, so that the "glow" may be referred to as "afterglow" (e.g., phosphorescence). In one example, after five minutes or greater of exposure of the outer surface 18 of a sample of a simplified version of the material 10 to direct sunlight, the sample was placed in a dark room and it was observed by a human observer with his or her naked eye that the light (e.g., afterglow or phosphorescence) emitted by the phosphor in the intermediate layer 16 lasted for about 7.5 hours. More generally, the afterglow or phosphorescence emitted by the phosphor in the intermediate layer 16 may last for at least thirty minutes, at least an hour, for several hours, up to about 7.5 hours, or any values or subranges therebetween.

It is believed that a suitable phosphor may be copper-activated zinc sulfide, strontium aluminate, and/or one or more other suitable phosphors. As a more specific example, it is believed that the intermediate layer 16 can include a single type of phosphor (e.g., copper-activated zinc sulfide, strontium aluminate, or other suitable phosphor) that is phosphorescent. Alternatively, it is believed that the intermediate layer 16 can include multiple, additional, or different types of phosphor.

The intermediate layer 16 may include from about 5 to about 40 wt %, for example, from about 10 to about 25 wt %, or for example about 25 wt % phosphorescent/glow in the dark masterbatch polymer. The masterbatch polymer itself may include any suitable amount of the phosphorescent component. In some examples, the masterbatch polymer may include from about 0.1 to about 35 wt %, from about 0.2 to about 25 wt %, or from about 0.5 to about 5 wt %, of the phosphorescent component (e.g., phosphor). However, other amounts and ranges of amounts may be suitable.

The presence of the phosphorescent component in the at least one intermediate layer 16, for example, phosphor and/or phosphorescent pigment, in a suitable amount imparts glow-in-the-dark attributes to the packaging material 10. Such attributes may be useful for a variety of purposes, including providing indicia in low light conditions, making packaging features for promotional, entertainment, or aesthetic purposes, or any other purpose, as discussed further below.

The inner film 26 may comprise any suitable polymer, copolymer, or blend of polymers. Examples of polymer films that may be suitable include nylon films, Surlyn™ ionomer films (copolymer of ethylene and methacrylic acid), high density polyethylene films, low density polyethylene films, linear low density polyethylene films, ethylene vinyl alcohol films, ethylene vinyl acetate films, or coextruded films including one or more of the above. The inner film 22 may generally have a basis weight of from about 10 to about 40 lb/ream, for example, from about 20 to about 30 lb/ream, for example, about 28 lb/ream. Metallized versions of any of such films may also be used (e.g., the inner web 14 may optionally include the barrier layer 28). Alternatively, it is believed that in some implementations the inner web 14 may comprise, consist essentially of, or consist of paper and/or any other suitable packaging material components.

Numerous variations of the above-described materials are contemplated hereby. For example, the packaging material 10 may also include other layers, as will be understood by those of skill in the art. Such layers may include overprint varnishes/lacquers, barrier coatings, matte, soft touch, or high gloss overprint varnishes/lacquers, or numerous other layers. The packaging materials may also include different types of printing, laser marking, scoring, opening or closure features, or other components.

As examples, two packaging material samples (Sample One and Sample Two) were prepared and evaluated. Sample One and Sample Two generally had the structure shown in FIG. 1, except that the ink 28 and barrier layer 28 were omitted. In this regard, it is believed that Table 1 describes the content of Sample One and Sample Two, in which "GID" refers to 7OGXXXXS0109 glow-in-the-dark polyethylene masterbatch polymer available from CTI (Colorado Springs, CO). Sample One and Sample Two were exposed to sunlight for about a minute and successfully continued to exhibit an intense phosphorescent glow after 25 minutes.

TABLE 1

|  | Sample One | Sample Two |
|---|---|---|
| Outer film (i.e., print layer) | ~10 lb/ream polyester film | ~10 lb/ream polyester film |
| Intermediate layer (extruded blend) | ~1.5 lb/ream GID<br>~8.5 lb/ream LLDPE carrier | ~2.5 lb/ream GID<br>~7.5 lb/ream LLDPE |
| Inner film (i.e., sealant layer) | ~28 lb/ream EVOH film | ~28 lb/ream EVOH film |

In another specific example of the material 10, the intermediate layer 16 can include 25 wt % of the GID and 75 wt % of the carrier (e.g., LLDPE or other suitable polymeric material). It is believed that these weight percentage values can vary by plus or minus about 25%, plus or minus about 20%, plus or minus about 15%, plus or minus about 10%, or plus or minus about 5%, including all values and subranges therebetween.

Examples of states of use and/or operativeness of the packaging material 10 are briefly described in the following, in accordance with an embodiment of this disclosure. In a backlit state of use of the packaging material 10 (e.g., when the packaging material is in sufficient darkness after the phosphor of the intermediate layer 16 has been exposed to sufficient light through the outer web 12), graphics that are at least partially defined by the ink 24 can be visually observed by a user viewing the outer surface 18 (e.g., at least some of the ink is backlit by the internal, phosphorescent light source). In a frontlit state of use of the packaging material 10, graphics that are at least partially defined by the ink 24 can be visually observed by a user viewing the outer surface 18 (e.g., at least some of the ink is frontlit by visible light from a luminous source that is exterior to the packaging material and directing light toward the outer surface 18).

It is believed that the flux of light emitted through the outer surface 18 during the backlit state of operation of the packaging material 10 can be increased by selectively incorporating at least some opaque or other suitable materials into the inner web 14 and/or intermediate layer 16, for example so that more of the afterglow is visible from the outer surface 18 than from the inner surface 20. For example, the inner web 14 can be more opaque and have a higher index of refraction than the outer web 12.

In one example, the inner web 14 and intermediate layer 16 can be transparent and/or translucent, and the barrier layer 28 (e.g., thin metallic layer) can be opaque or at least partially opaque in a manner such that the reflective and/or refractive characteristics of the barrier layer redirect at least some of the light from the phosphorescent light source outwardly toward the outer surface 18 of the material 10.

As another example, the barrier layer 28 can be replaced with an opaque layer 28 having relatively less barrier properties, so that reflective and/or refractive characteristics of the opaque layer 28 redirect at least some of the light from the phosphorescent light source outwardly toward the outer surface 18. The opaque layer 28 may include a suitable pigment (e.g., white colorant such as titanium dioxide) in a suitable carrier, or the like.

As a further example of a configuration that seeks to increase the light emitted through the outer surface 18 during the backlit state and that does not include the opaque or barrier layer 28, the inner film 26 may be opaque and/or have reflective and/or refractive characteristics that redirect at least some of the light from the phosphorescent light source outwardly toward the outer surface 18. For example, the inner film 26 may include a suitable pigment (e.g., white colorant such as titanium dioxide) having reflective and/or refractive characteristics that redirect at least some of the light from the phosphorescent light source outwardly toward the outer surface 18.

In another example of a configuration that seeks to increase the light emitted through the outer surface 18 during the backlit state, it is believed that at least a portion of the intermediate layer 16 may further include a suitable pigment (e.g., white colorant such as titanium dioxide) and/or other suitable material having reflective and/or refractive characteristics that redirect at least some of the light from the phosphorescent light source outwardly toward the outer surface 18.

Aspects of an example of a method of manufacturing the material 10 are described in the following, with reference to FIG. 2. The manufacturing of the packaging material 10 can occur in a system 40 and include laminating at least the outer and inner webs 12, 14 (e.g., first and second webs) to one another through the use of adhesive material 42 (e.g., extruded, thermoplastic polymeric material) that contains phosphor and forms the intermediate layer 16 (FIG. 1). For example, a pair of rollers 44 can form a nip toward which the webs 12, 14 are drawn, and in which the webs 12, 14 and adhesive material 42 are received as part of the laminating process. The adhesive 42 containing the phosphor can cool and/or cure to form the intermediate layer 16 and secure the webs 12, 14 to one another.

The providing of the adhesive 42 and resulting intermediate layer 16 (e.g., at least one intermediate material) can include: providing precursor material to at least one extruder, wherein the precursor material comprises the thermoplastic polymeric material (e.g., LLDPE) and additive masterbatch (e.g., GID), and the additive masterbatch comprises the phosphor; extruding the precursor material to form a blended extrudate; and the extrudate being between the webs 12, 14 in the nip. As another example, the intermediate layer 16 (e.g., at least one intermediate material) can be a multilayer coextrusion (e.g., formed by coextruding during the laminating) comprising, consisting essentially of, or consisting of a film of the additive masterbatch (e.g., GID) positioned between first and second films of the thermoplastic polymer material (e.g., LLDPE). The forming of the material 10 (e.g., laminating) can be performed in any suitable manner.

The system 40 can include at least one ultraviolet ("UV") radiation or light source 46 mounted along the path of travel of the material 10 downstream from the nip rollers 44, for exposing the phosphor of the intermediate layer 16 to UV radiation or light through the outer web 12. In response to the UV radiation or light, the phosphor of the intermediate layer 16 can emit light outwardly through the outer web 12. Operator(s) of the system 40 and/or camera(s) of the system 40 can visually observe the light emitted by the phosphor of the intermediate layer 16 for quality control purposes. In this regard it is believed that the phosphor of the intermediate layer 16 may be relatively highly responsive to UV radiation or light as compared to visible light, so that the phosphor of the intermediate layer 16 emits light in the form of phosphorescence or afterglow more quickly and brightly when exposed to a quantity of UV radiation as compared to a similar quantity of visible light.

Figure 2:
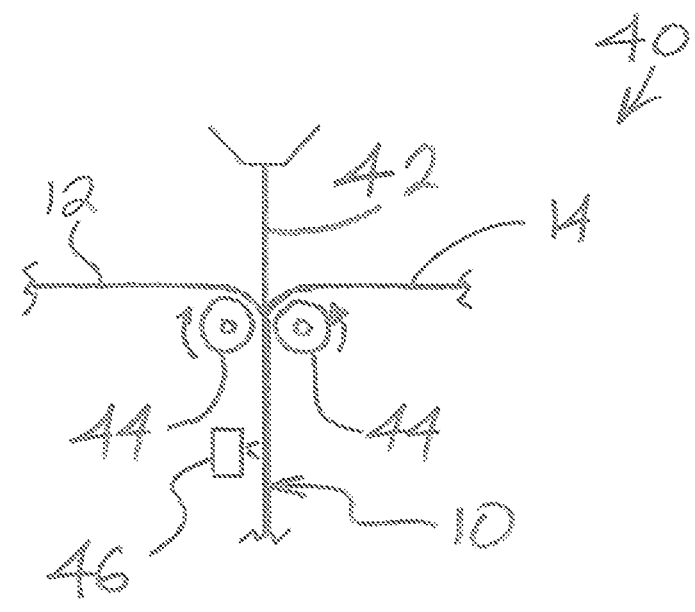
FIG. 2 is a side view depicting aspects of a method of forming an example of the packaging material of FIG. 1, in accordance with an embodiment of this disclosure.

As an example, upstream from the portion of the system 40 depicted in FIG. 2, the outer web 12 (e.g., first web) can be at least partially formed by drawing the outer film 22 (e.g., first film) along a web travel path through a conventional printing press (not depicted), wherein the one or more ink layers 24 are formed by printing (e.g., reverse printing) on the outer film. The printing press typically is a multi-station printing press including a series of individual printing devices (e.g., flexographic printing presses) that are spaced apart along the length of the web travel path.

As compared to one another, each of the printing devices can be configured to print/apply a different color ink onto the outer film 22 and/or provide different print opacities. For example, it is believed that each of the printing devices can provide print opacity selected from a range of at least from about 5% (e.g., 95% light transmission to allow relatively high transmission of the light from the phosphorescent light source) to at least about 95% opacity (e.g., 5% light transmission for attenuating or muting the light from the phosphorescent light source and, thus, allowing relatively low transmission of the light from the phosphorescent light source). It is believed that the glow (e.g., phosphorescence or afterglow) from the phosphorescent light source begins to be muted with non-white ink colors at about 65% opacity, while glow (e.g., phosphorescence or afterglow) can still be viewed through white print up to about 75% opacity.

In other embodiments (not depicted), the phosphor of the packaging material 10 is included separately from the at least one intermediate layer 16, and may optionally be positioned for backlighting all or a portion of any ink 24 and/or graphics. For example, the phosphor may be printed onto or otherwise included on or in the outer web 12 and/or the inner web 14. In such embodiments, the phosphor may be provided in a carrier material (if needed) and be applied to the web(s) 12, 14 and/or any other suitable portion of the material 10, for example in any suitable pattern or configuration to selectively illuminate (e.g., backlight) one or more predetermined areas of the material 10.

As an example, FIG. 3 is a front view of a closed package, or more specifically a closed bag 50, formed from a piece of the packaging material 10. For example, the material 10 may be sufficiently flexible to be formed into bags in a conventional form-fill-seal packaging machine. In the example of FIG. 3, the outer web's outer surface 18 defines the exterior surface of the bag 50. The packaging material 10 of the bag 50 extends around an interior space of the bag, and the interior space is closed by seams configured to at least partially (e.g., temporarily) obstruct access to the interior space of the bag.

The seams can respectively be in the form of, or can be defined by seals. The seals can be lap seals, fin seals, and/or any other suitable seals. In the example of FIG. 3, the seals include opposite end seals 52 and a lengthwise seal or fin seal that is hidden from view. The lengthwise or fin seal typically extends from one to the other of the end seals 52. The lengthwise seal or fin seal can be a lap seal or any other suitable seal.

The bag 50 can be formed by folding the piece of packaging material 10 onto itself, so that respective marginal portions of the heat-sealable layer 20 are in opposing face-to-face contact with one another, and heat and pressure can be applied to those marginal portions to form the seals. Alternatively, the seals can be formed using a cold-seal adhesive, or in any other suitable manner. The package, or more specifically the bag 50, can completely enclose one or more articles (e.g., food products or any other suitable articles) in a hermitically sealed manner.

In the example of FIG. 3, the outer film 22 is transparent so that the inks 24, or more specifically graphics that are at least partially defined by the inks, are visible through the outer film during the frontlit state of use of the package 50. In the example depicted in FIG. 3, the inks 24 and/or graphics can define a background portion 60 extending around and between a first image 62 (e.g., a pile of chips), a second image 64 (e.g., a bowl), first indicia 66 (e.g., "CHIPS"), and second indicia 68 (e.g., "BAKED BARBEQUE FLAVORED CHIPS"). The ink 24 defining the background portion 60 is typically a different color than the other one or more inks defining the other graphics portions 62, 64, 66, 68, and/or one or more of the graphics portions 62, 64, 66, 68 may not be printed/may not include ink 24 so as to be at least partially defined by void(s) in the background portion 60.

In one specific example: the ink 24 defining the background portion 60 is a different color than the inks defining other graphics portions 62, 64, 68; the first indicia 66 does not include ink 24/is not printed so that it is at least partially defined by voids in the background portion 60; at least one ink defining the first image 62 is a different color than at least one ink defining the second image 64; the inks of the graphics portions 60, 64, 68 are printed to greater than 65% opacity; and at least one ink of the first image 62 is printed to less than 65% opacity. In this example, during the backlit state while the package 50 is in a dark environment, the phosphorescence afterglow may not (or substantially may not) pass outwardly through the graphics portions 60, 64, 68 so that the graphics portions 60, 64, 68 do not (or substantially do not) glow; the phosphorescence afterglow may pass outwardly through the first image 62 in an attenuated manner so that the first image 62 glows more brightly than any glowing of the graphics portions 60, 64, 68; and the phosphorescence afterglow may pass outwardly through the first indicia 66 in a non-attenuated (substantially non-attenuated) manner so that the first indicia 66 glows more brightly than the first image 62. For example, more light per unit area can travel outwardly through the graphics portions 62, 66 than the graphics portions 60, 64, 68, and more light per unit area can travel outwardly through the first indicia 66 than the first image 62.

Considered in isolation, the phosphorescent afterglow may be colored (e.g., green). Therefore, the color, shade or hue of the first image 62 as observed by a user viewing the outer surface 18 of the package 50 in the frontlit state can vary from the color, shade or hue of the first image 62 as observed by a user viewing the outer surface 18 of the package 50 in the backlit state. Similarly, the color, shade or hue of the first indicia 66 as observed by a user viewing the outer surface 18 of the package 50 in the frontlit state can vary from the color, shade or hue of the first indicia 66 as observed by a user viewing the outer surface 18 of the package 50 in the backlit state. A wide variety of variations in the inks 24, graphics, and colors are within the scope of this disclosure.

To supplement the present disclosure, this application incorporates entirely by reference each of Patent Application Publication Nos. WO 2019/059958 and WO 2019/067005, and each of the U.S. patent application publications resulting from U.S. national phase entry of International Patent Application Nos. PCT/US2017/063643 and PCT/US2018/000373.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

Reiterating from above, it is within the scope of this disclosure for one or more of the terms "substantially," "about," "approximately," and/or the like, to qualify each of the adjectives and adverbs of the foregoing disclosure, for the purpose of providing a broad disclosure. As an example, it is believed that those of ordinary skill in the art will readily understand that, in different implementations of the features of this disclosure, reasonably different engineering tolerances, precision, and/or accuracy may be applicable and suitable for obtaining the desired result. Accordingly, it is believed that those of ordinary skill will readily understand usage herein of the terms such as "substantially," "about," "approximately," and the like.

In the specification and drawings, examples of embodiments have been disclosed. The present invention is not limited to such exemplary embodiments. The use of the term "and/or" includes any and all combinations of one or more of the associated listed items. Unless otherwise noted, specific terms have been used in a generic and descriptive sense and not for purposes of limitation.

What is claimed is:

1. A package comprising:
    a flexible packaging material extending at least partially around an interior space of the package, wherein the packaging material comprises a flexible laminate, and the laminate comprises:
        a first web defining a first side of the packaging material, the first web comprising a polymer film and ink visible from the first side of the packaging material, wherein the ink at least partially defines graphics, at least a portion of the first side of the packaging material forms an exterior surface of the package, the polymer film has opposite inner and outer sides, the inner side of the polymer film is positioned between the interior space of the package and the outer side of the polymer film, and at least some of the ink is on the inner side of the polymer film,
        a second web defining a second side of the packaging material that is opposite from the first side of the packaging material, and
        at least one intermediate layer positioned between and connecting the first and second webs to one another, wherein the at least one intermediate layer comprises phosphor configured to at least emit an afterglow in response to exposure to light,
    wherein the packaging material is configured so that when the phosphor emits an afterglow, at least some of the graphics are backlit by at least some of the afterglow, and
    wherein a first portion of the graphics has a greater opacity than a second portion of the graphics; and when the phosphor emits an afterglow, more light per unit area travels outwardly through the second portion of the graphics than through the first portion of the graphics.

2. The package according to claim 1, wherein the at least one intermediate layer comprises thermoplastic polymeric material.

3. The package according to claim 1, wherein the packaging material is configured so that when the phosphor emits an afterglow, at least some of the afterglow travels outwardly through the first layer and outwardly through at least some of the ink of the first layer.

4. The package according to claim 1, wherein:
    the interior space is at least partially closed by seals at opposite ends of the package,
    at least some of the graphics are reverse printed on the inner side of the polymer film of the first web so that the reverse printed graphics are on the inner side of the polymer film of the first web,
    the at least one intermediate layer comprises a layer of thermoplastic material that includes the phosphor,
    at least a portion of the second side of the packaging material that is opposite from the first side of the packaging material forms an interior surface of the package, and
    the second web comprises a second polymer film having opposite inner and outer sides, wherein the inner side of the second polymer film is positioned between the interior space of the package and the outer side of the second polymer film, and a metallic barrier layer on the outer side of the second polymer film, wherein the metallic barrier layer is configured to reflect at least some of the afterglow outwardly toward the exterior surface of the package.

5. A method of using the package according to claim 1, wherein the method comprises:
    exposing the exterior surface of the package to light, so that at least some of the light is transmitted through the first web, and at least some of the phosphor is exposed to at least some of the light transmitted through the first web; and
    the phosphor emitting afterglow in response to the phosphor being exposed to at least some of the light transmitted through the first web, and at least some of the afterglow backlighting at least a portion of the graphics that are at least partially defined by the ink.

6. A package, comprising:

a laminate extending at least partially around an interior space of the package, wherein the laminate comprises:

an outer composite layer defining an exterior surface of the package, the outer composite layer comprising a polymer film and ink visible from the exterior surface of the package, wherein the ink at least partially defines graphics, the polymer film has opposite inner and outer sides, the inner side of the polymer film is positioned between the interior space of the package and the outer side of the polymer film, and at least some of the ink is on the inner side of the polymer film;

an inner layer; and at least one intermediate layer positioned between and connecting the outer composite layer and the inner layer to one another, wherein the at least one intermediate layer comprises phosphor configured to at least emit an afterglow in response to exposure to light, wherein the package is configured so that when the phosphor emits an afterglow, at least some of the graphics are backlit by at least some of the afterglow, wherein:

the interior space is at least partially closed by seals at opposite ends of the package, at least some of the graphics are reverse printed on the inner side of the polymer film of the outer composite layer so that the reverse printed graphics are on the inner side of the polymer film of the outer composite layer, the at least one intermediate layer comprises a layer of thermoplastic material that includes the phosphor and the at least one intermediate layer has opposite inner and outer sides, the inner side of the at least one intermediate layer is positioned between the interior space of the package and the outer side of the at least one intermediate layer; and the inner layer comprises a second polymer film having opposite inner and outer sides, wherein the inner side of the second polymer film is positioned between the interior space of the package and the outer side of the second polymer film and wherein at least a portion of the inner side of the second polymer film forms an interior surface of the package, and a metallic barrier layer on the outer side of the second polymer film, wherein the metallic barrier layer directly contacts the inner side of the at least one intermediate layer and is configured to reflect at least some of the afterglow outwardly toward the exterior surface of the package.

7. The package according to claim 6, wherein:

a first portion of the graphics has a greater opacity than a second portion of the graphics; and when the phosphor emits an afterglow, more light per unit area travels outwardly through the second portion of the graphics than the first portion of the graphics.

8. The package according to claim 6, wherein the package is a bag, and the interior space is at least partially closed by seals at opposite ends of the bag.

9. A method of using the package according to claim 6, wherein the method comprises:

exposing the exterior surface of the package to light, so that at least some of the light is transmitted through the outer composite layer, and at least some of the phosphor is exposed to at least some of the light transmitted through the outer composite layer; and the phosphor emitting afterglow in response to the phosphor being exposed to at least some of the light transmitted through the outer composite layer, and at least some of the afterglow backlighting at least a portion of the graphics that are at least partially defined by the ink.

10. A package comprising:

a flexible packaging material extending at least partially around an interior space of the package, wherein the packaging material comprises a flexible laminate, and the laminate comprises:

a first web defining a first side of the packaging material, the first web comprising a polymer film and ink visible from the first side of the packaging material, wherein the ink at least partially defines graphics, at least a portion of the first side of the packaging material forms an exterior surface of the package, the polymer film has opposite inner and outer sides, the inner side of the polymer film is positioned between the interior space of the package and the outer side of the polymer film, and at least some of the ink is on the inner side of the polymer film, a second web defining a second side of the packaging material that is opposite from the first side of the packaging material, and at least one intermediate layer positioned between and connecting the first and second webs to one another, wherein the at least one intermediate layer comprises phosphor configured to at least emit an afterglow in response to exposure to light, wherein the packaging material is configured so that when the phosphor emits an afterglow, at least some of the graphics are backlit by at least some of the afterglow, wherein the second web comprises a second polymer film, and wherein the second polymer film and/or at least a portion of the at least one intermediate layer has greater opacity than the first web and/or wherein the second polymer film and/or at least a portion of the at least one intermediate layer has a higher index of refraction than the first web so that when the phosphor emits an afterglow, more of the afterglow is visible from the first side of the packaging material than from the second side of the packaging material.

11. The package according to claim 10, wherein the second polymer film and/or the at least a portion of the at least one intermediate layer includes pigment to provide greater opacity and/or a higher index of refraction to the second polymer film and/or to the at least a portion of the at least one intermediate layer compared to the opacity and/or index of refraction of the first web.

* * * * *